W. J. NEIDHART AND H. HIGH.
VEHICLE LOCK.
APPLICATION FILED MAY 19, 1919.
1,319,609.
Patented Oct. 21, 1919.
2 SHEETS—SHEET 1.
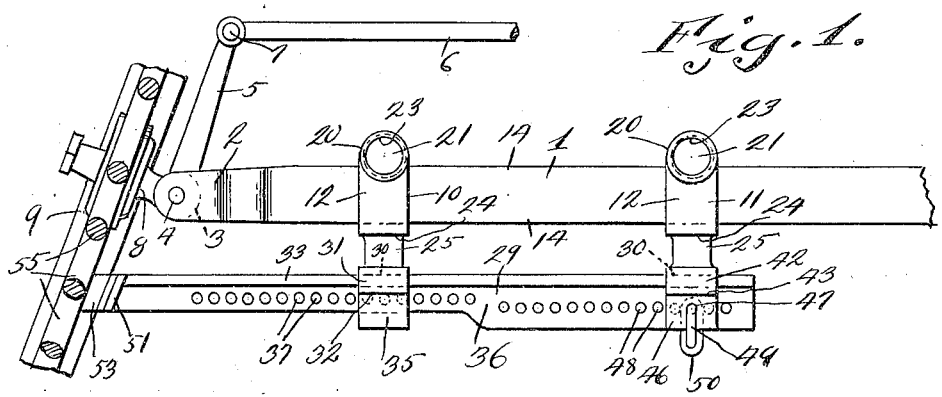
Fig. 1.
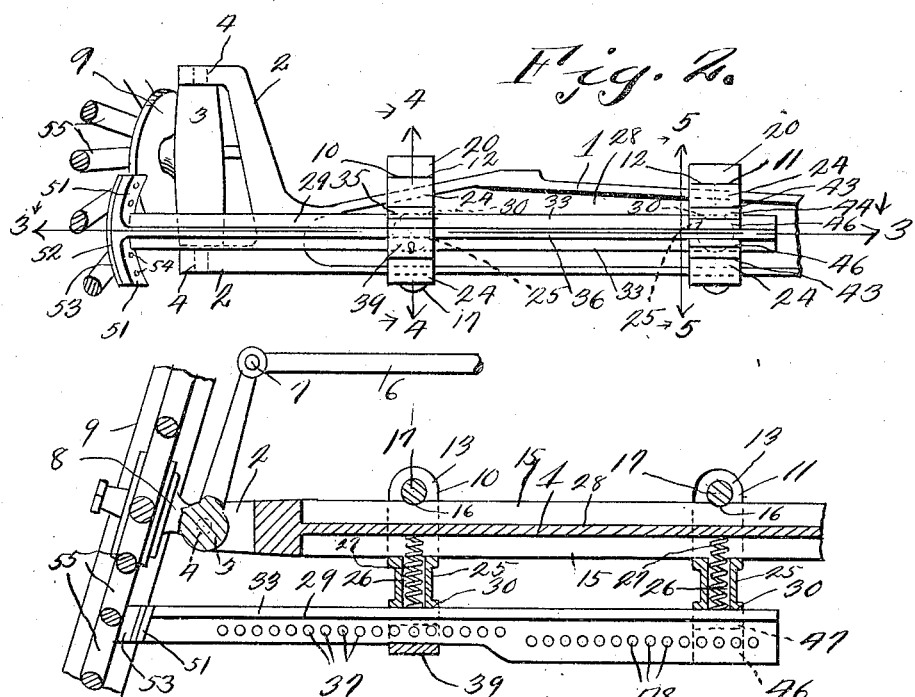
Fig. 2.
Fig. 3.
Inventors
W. J. Neidhart
H. High
By D. Swift
their Attorney

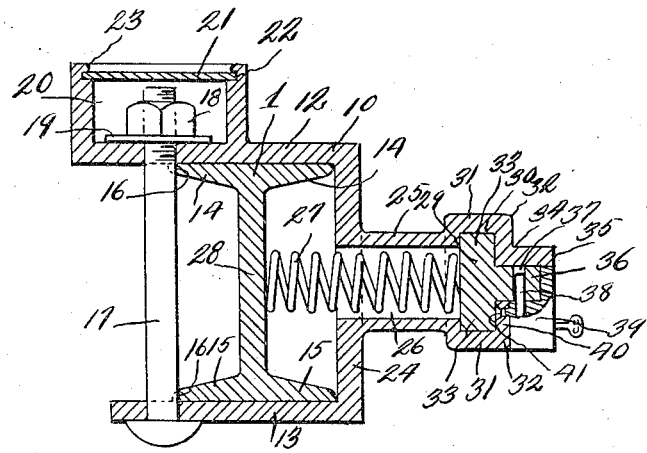
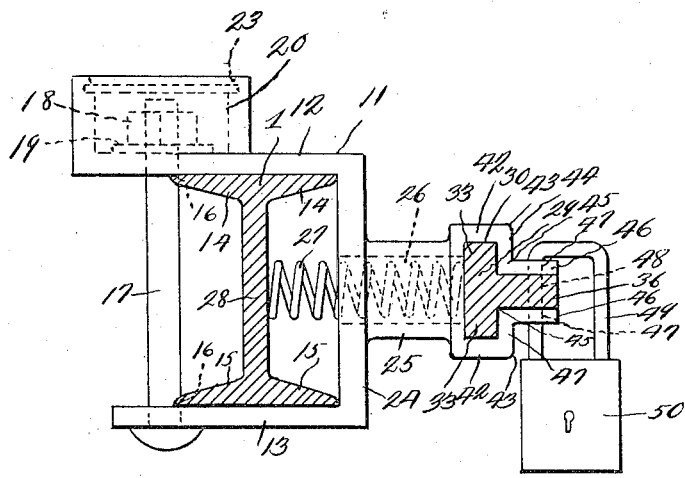

UNITED STATES PATENT OFFICE.

WILLIAM J. NEIDHART, OF MANSFIELD, AND HARRY HIGH, OF MARION, OHIO.

VEHICLE-LOCK.

1,319,609.  Specification of Letters Patent.  Patented Oct. 21, 1919.

Application filed May 19, 1919. Serial No. 298,039.

*To all whom it may concern:*

Be it known that we, WILLIAM J. NEIDHART and HARRY HIGH, citizens of the United States, residing at Mansfield and Marion, respectively, in the counties of Richland and Marion, State of Ohio, have invented a new and useful Vehicle-Lock; and we do hereby declare the following to be a full, clear, and exact description of the invention, such as will enable others skilled in the art to which it appertains to make and use the same.

The invention relates to vehicle locks and has for its object to provide a lock of this character, wherein the front wheels of a vehicle, preferably an automobile, will when the lock is in locked position be prevented from being moved by the steering mechanism from an angled position, thereby preventing the running of the vehicle except in a circle.

A further object is to provide a lock carried by the front axle of a vehicle, and comprising a slidable bar slidable in brackets carried by the axle and to provide the out end of the slidable bar with a convex surface, which engages the spokes of a wheel so as to maintain the wheel in angled position, and so construct the convex end so that the spokes of the wheel will cam over the same as the wheel is revolved.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a plan view of one end of an automobile axle, showing the sliding bar in locked position and engaging the spokes of a wheel.

Fig. 2 is a front elevation of the same.

Fig. 3 is a horizontal sectional view taken on line 3—3 of Fig. 2.

Fig. 4 is a sectional view taken on line 4—4 of Fig. 2.

Fig. 5 is a sectional view taken on line 5—5 of Fig. 2.

Referring to the drawings the numeral 1 designates the front axle of an automobile, which is provided with the arms 2 and disposed between said arms is the usual spindle 3 which is pivotally mounted in bearings 4 of the arms 2. The spindle 3 is provided with a rearwardly extending spindle arm 5 to which the steering connecting rod 6 is pivoted as at 7. The spindle is provided with a horizontal spindle 8 on which the wheel 9 revolves.

Brackets 10 and 11 are secured to the axle and each bracket comprises the arms 12 and 13, which are adapted to engage the upper and lower flanges 14 and 15, one of each of the flanges 14 and 15 being provided with a notch 16 which receives one side of the bolt 17 which passes through the arms 12 and 13 for securely clamping the brackets on the axle. The upper ends of the bolts 17 being provided with nuts and washers 18 and 19 for drawing the arms 12 and 13 together. The arms 12 are provided with integral housings 20, which house the upper ends of the bolts, there being metallic disks 21 disposed in grooves 22 and are held therein by means of the upset edges 23 of the housing. The disks prevent the removal of the nuts 18 from the bolts 17 by unauthorized persons. The arms 12 and 13 are integrally connected together by means of the portions 24 and are provided with integral cylindrical portions 25 having cylindrical chambers 26, in which are coiled springs 27 having their inner ends bearing against the web 28 of the axle 1, their outer ends being in engagement with a T-shaped slidable bar 29, which is slidable in T-shaped bearings carried by the ends of the cylindrical portions 25. The bearing 30 of the bracket 10 is formed by the upper and lower arms 31, which are bent as at 32 to overlie the vertical portions 33 of the bar 29 and one arm is again bent as at 34 to form horizontal portions 35 which engages the upper surface of the horizontal portion or flange 36 of the T-shaped bar 29, which horizontal flange is provided with apertures 37 in which the sliding bolt 38 of the lock 39 is adapted to engage, the lock being secured to the arm 40 as at 41. The lock may be of any suitable structure and may be key operated or a combination type of lock.

Bracket 11 is practically of the same shape as bracket 10, however the arms 42 are bent as at 43 so as to form portions to engage the vertical flanges of the T-shaped bar 29 and are in turn bent as at 45 to form parallel arms 46 which engage the upper and lower surfaces of the horizontal flange 36 of the bar 29, there being apertures 47 in arms 46 adapted to register with apertures 48 is the flange 36, said registering apertures being adapted to receive the shackle 49 of any form of padlock 50.

The outer end of the slidable bar 29 is provided with integral arms 51 which are curved so as to form the convex surface 52, to which a facing of leather 53 is secured by rivets 54, said leather facing preventing the marring of the spokes 55 of the wheel when the sliding bar is locked in its outer position, and the convex shape of the wheel engaging end of the bar allowing the spokes to cam over the same.

When it is desired to lock the vehicle wheel at an angle, the wheel is turned by the steering mechanism to the proper angle, then the T-shaped bar is pulled outwardly until the convex end thereof is in engagement with the spokes of the wheel. When the parts are in this position, the locks of the brackets, or one of them is locked so that the bolts thereof will pass through the registering apertures of the flange 36 of the T-shaped bar and the apertures of the horizontal portions 35 and 45 of the brackets 10 and 11. It will be seen that if the vehicle is started by unauthorized persons, that the wheel will revolve, but will be prevented from being positioned except at an angle, therefore the vehicle as a whole will move in a circle, under which condition it could not be moved for a great distance.

When the locking mechanism is not needed, the locks are unlocked and the T-shaped bar is moved inwardly and is frictionally held in inward position by means of the coiled springs 27 disposed between the rear end thereof and the web of the axle 1, however if so desired the bar may be locked in inoperative position by means of either or both of the locks.

The invention having been set forth what is claimed as new and useful is:—

1. A lock for vehicles comprising a slidable bar slidable in brackets secured to the axle of a vehicle, said slidable bar being T-shaped in cross section and slidable in bearings of the brackets, the horizontal flange of the T-shaped bar being provided with apertures for the reception of locking bolts which pass through apertures in the brackets so that the outer end of the slidable bar may be locked in engagement with the vehicle wheel when the same is at various angles and springs disposed between the slidable bar and the axle whereby the slidable bar will be prevented from displacement when the same is in unlocked position.

2. A lock for vehicles comprising a slidable bar slidable in brackets secured to the axle of a vehicle, said slidable bar being T-shaped in cross section and slidable in bearings of the brackets, the horizontal flange of the T-shaped bar being provided with apertures which register with apertures in the brackets so as to receive locking bolts for locking the slidable bar in various horizontal positions, the outer end of the slidable bar being provided with a vertically disposed convex surface of greater width than the space between the spokes, said convex surface being adapted to engage the spokes of the wheel and allow the spokes to slide over the convexed surface as the wheel is revolved and also preventing and limiting the horizontal pivoting of the wheel so as to cause the vehicle to move in the direction in which the wheel is positioned and locked, and spring means for maintaining the T-shaped bar out of engagement with the wheel.

In testimony whereof we have signed our names to this specification in the presence of two subscribing witnesses.

WILLIAM J. NEIDHART.
HARRY HIGH.

Witnesses:
OLLIE L. HABERMAN,
CHARLES W. HABERMAN.